United States Patent
Yang et al.

(10) Patent No.: US 10,514,788 B2
(45) Date of Patent: *Dec. 24, 2019

(54) IN-CELL TOUCH PANEL AND DISPLAY DEVICE, TOUCH DRIVING METHOD

(71) Applicants: BOE Technology Group Co., Ltd., Beijing (CN); Beijing BOE Optoelectronics Technology Co., Ltd., Beijing (CN)

(72) Inventors: Jiuxia Yang, Beijing (CN); Jiantao Liu, Beijing (CN)

(73) Assignees: BOE Technology Group Co., Ltd., Beijing (CN); Beijing BOE Optoelectronics Technology Co., Ltd., Beijing (CN)

( * ) Notice: Subject to any disclaimer, the term of this patent is extended or adjusted under 35 U.S.C. 154(b) by 703 days.

This patent is subject to a terminal disclaimer.

(21) Appl. No.: 14/787,816

(22) PCT Filed: Feb. 10, 2015

(86) PCT No.: PCT/CN2015/072677
§ 371 (c)(1),
(2) Date: Oct. 29, 2015

(87) PCT Pub. No.: WO2016/070524
PCT Pub. Date: May 12, 2016

(65) Prior Publication Data
US 2018/0188860 A1   Jul. 5, 2018

(30) Foreign Application Priority Data
Nov. 6, 2014   (CN) .......................... 2014 1 0643152

(51) Int. Cl.
G06F 3/041 (2006.01)
G06F 3/044 (2006.01)
G09G 3/36 (2006.01)

(52) U.S. Cl.
CPC ............ *G06F 3/0412* (2013.01); *G06F 3/044* (2013.01); *G06F 3/0416* (2013.01);
(Continued)

(58) Field of Classification Search
CPC ...... G06F 3/044; G06F 3/3648; G06F 3/0412; G06F 2203/04101; G06F 2203/04111
See application file for complete search history.

(56) References Cited

U.S. PATENT DOCUMENTS

2008/0062139 A1   3/2008   Hotelling et al.
2010/0194697 A1   8/2010   Hotelling et al.
(Continued)

FOREIGN PATENT DOCUMENTS

CN   102830879 A   12/2012
CN   102855038 A   1/2013
(Continued)

OTHER PUBLICATIONS

Jul. 29, 2015—International Search Report Appn PCT/CN2015/072677 with Eng Tran of Written Opinion.
(Continued)

*Primary Examiner* — Kent W Chang
*Assistant Examiner* — Chayce R Bibbee
(74) *Attorney, Agent, or Firm* — Banner & Witcoff, Ltd.

(57) ABSTRACT

An in-cell touch panel and a display device, a touch driving method are disclosed. A common electrode layer in an array substrate is partitioned into a plurality of sub-electrodes arranged in an array. Sub-electrodes that are alternately disposed in a respective row of sub-electrodes serve as touch driving sub-electrodes that form a touch driving electrode. Sub-electrodes other than the touch driving sub-electrodes serve as common sub-electrodes. Touch sensing electrodes with projections within areas where corresponding common sub-electrodes are located are provided on an opposed
(Continued)

substrate. Upon a line-by-line scanning of gate lines covered by respective rows of sub-electrodes, sub-electrodes in a currently-scanned row are applied with a common electrode signal, touch driving electrodes in rows of sub-electrodes other than the currently-scanned row of sub-electrodes are applied with touch driving signals.

17 Claims, 6 Drawing Sheets

(52) U.S. Cl.
CPC . *G09G 3/3648* (2013.01); *G06F 2203/04101* (2013.01); *G06F 2203/04111* (2013.01)

(56) References Cited

U.S. PATENT DOCUMENTS

| | | | |
|---|---|---|---|
| 2011/0267305 A1 | 11/2011 | Shahparnia et al. | |
| 2012/0044195 A1 | 2/2012 | Nakanishi et al. | |
| 2013/0215075 A1* | 8/2013 | Lee | G06F 3/044 345/174 |
| 2014/0049508 A1* | 2/2014 | Kim | G06F 3/044 345/174 |
| 2014/0062935 A1 | 3/2014 | Bi | |
| 2014/0132534 A1* | 5/2014 | Kim | G06F 3/0412 345/173 |
| 2014/0132560 A1 | 5/2014 | Huang et al. | |
| 2014/0306916 A1* | 10/2014 | Wang | G06F 3/041 345/173 |
| 2016/0026289 A1 | 1/2016 | Liu et al. | |

FOREIGN PATENT DOCUMENTS

| | | |
|---|---|---|
| CN | 103593083 A | 2/2014 |
| CN | 103760708 A | 4/2014 |
| CN | 103838430 A | 6/2014 |
| CN | 103838431 A | 6/2014 |
| CN | 104090678 A | 10/2014 |
| CN | 104090697 A | 10/2014 |
| CN | 104317467 A | 1/2015 |
| CN | 204129705 U | 1/2015 |
| CN | 204166510 U | 2/2015 |
| EP | 3217266 A1 | 9/2017 |
| JP | 2011141519 A | 7/2011 |
| KR | 20140087483 A | 7/2014 |

OTHER PUBLICATIONS

Jul. 10, 2017—(CN) Second Office Action Appn 201410643152.3 with English Tran.
Nov. 30, 2016—(CN) First Office Action Appn 201410643152.3 with English Tran.
May 4, 2018—(EP) Extended European Search Report Appn 15778182.4.
Jul. 29, 2015—(WO) International Search Report Appn PCT/CN2015/073009.
May 9, 2017—(WO) International Preliminary Report on Patentability Appn PCT/CN2015/073009.
Nov. 30, 2016—(CN) First Office Action Appn 201410638383.5 with English Tran.
Mar. 27, 2018—(EP) Extended European Search Report Appn 15778596.5.
Sep. 27, 2016—U.S. Office Action U.S. Appl. No. 14/888,145.

\* cited by examiner

IN-CELL TOUCH PANEL AND DISPLAY DEVICE, TOUCH DRIVING METHOD

The application is a U.S. National Phase Entry of International Application No. PCT/CN2015/072677 filed on Feb. 10, 2015, designating the United States of America and claiming priority to Chinese Patent Application No. 201410643152.3 filed on Nov. 6, 2014. The present application claims priority to and the benefit of the above-identified applications and the above-identified applications are incorporated by reference herein in their entirety.

TECHNICAL FIELD

At least one embodiment of the present disclosure relates to an in-cell touch panel and a display device, and a touch driving method.

BACKGROUND

An in-cell touch panel has touch electrodes embedded inside a liquid crystal display, which can reduce an overall thickness and drastically reduce manufacturing costs. Thus, in-cell touch panels are favored by panel manufacturers.

At present, in-cell touch panels generally implement detection of finger touch positions by utilizing, for example, a mutual capacitance principle. An in-cell touch panel utilizing the mutual capacitance principle is generally implemented by adding patterns of touch electrodes to the touch panel, where the touch electrodes include touch driving electrodes and touch sensing electrodes.

SUMMARY

Embodiments of the present disclosure provide an in-cell touch panel and a display device, and a touch driving method, to solve display and touch problems resulted from insufficiency of time caused by a driving method that is employed by in-cell touch panels and implements touch and display functions in a time-division manner.

At least one embodiment of the present disclosure provides an in-cell touch panel including: an array substrate that includes gate lines and a common electrode layer, and an opposed substrate disposed oppositely to the array substrate. The common electrode layer of the array substrate is partitioned into a plurality of sub-electrodes arranged in an array. Sub-electrodes that are disposed alternately in a respective row of sub-electrodes serve as touch driving sub-electrodes which form a touch driving electrode, and sub-electrodes other than the touch driving sub-electrodes serve as common sub-electrodes. Upon a line-by-line scanning of gate lines covered by respective rows of sub-electrodes, sub-electrodes in a currently-scanned row of sub-electrodes are used to be applied with a common electrode signal, touch driving electrodes in rows of sub-electrodes other than the currently-scanned row of sub-electrodes are used to be applied with touch driving signals. The opposed substrate includes a plurality of touch sensing electrodes disposed across and over the touch driving electrodes, and an orthogonal projection of each of the touch sensing electrodes on the array substrate is located within an area where a corresponding common sub-electrode is located.

At least one embodiment of the present disclosure provides a display device including the above-mentioned in-cell touch panel provided in the embodiments of the present disclosure.

At least one embodiment of the present disclosure further provides a touch driving method including: scanning, in a line-by-line manner, gate lines covered by respective rows of sub-electrodes from sub-electrodes that are arranged in an array, where the sub-electrodes arranged in the array are included in a common electrode layer on an array substrate. In this step, sub-electrodes that are disposed alternately in a respective row of sub-electrodes serve as touch driving sub-electrodes which form a touch driving electrode, and sub-electrodes other than the touch driving sub-electrodes serve as common sub-electrodes. The touch driving method further includes: upon scanning the gate lines covered by the respective rows of sub-electrodes in the line-by-line manner, applying a common electrode signal to sub-electrodes in a currently-scanned row, and applying touch driving signals to touch driving electrodes in rows of sub-electrodes other than the currently-scanned row of sub-electrodes.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

FIG. 4b is an operation timing diagram for FIG. 4a;

FIG. 5b is an operation timing diagram for FIG. 5a.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. Terms such as "first", "second" and the like used in the present disclosure do not indicate any sequence, quantity or significance but only for distinguishing different constituent parts. Also, the terms such as "a," "an," or "the" etc., are not intended to limit the amount, but indicate the existence of at lease one. The terms "comprises," "comprising," "includes," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Figure 1:
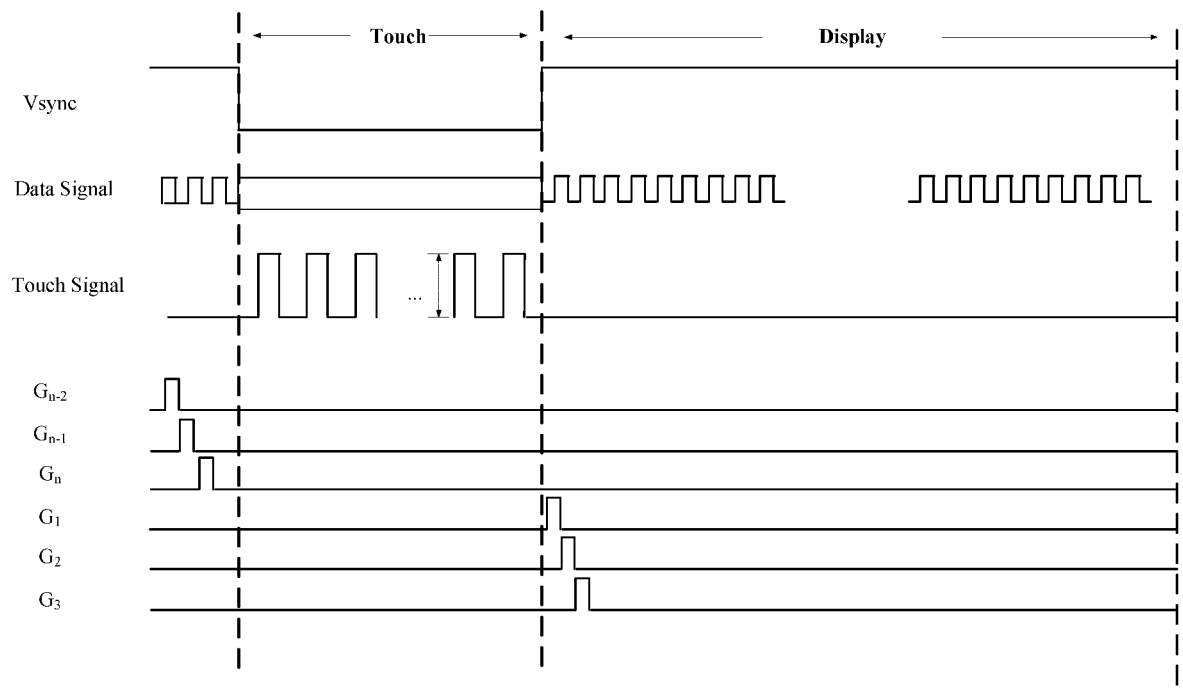
FIG. 1 is a timing diagram for an in-cell touch panel.

In order to avoid mutual interference between touch signals loaded to touch electrodes and normal display signals in the touch panel, a touch function and a display function are typically implemented with a time-division driving method. That is, as shown in FIG. 1, a time period for a frame (Vsync) is divided into a touch interval (Touch) and a display interval (Display). Data signals and gate lines Gn-2, Gn-1, Gn, G1, G2 and G3 only work in the display interval and touch signals only work in the touch interval.

During research, inventors of the present application have found that, under a scenario shown in FIG. 1, respective durations assigned to a touch interval and a display interval in each frame are relatively short, and various display and touch problems would occur due to insufficiency of time caused by time-division driving when a high resolution display is needed.

Embodiments of the present disclosure will be described in detail below with reference to accompanying drawings. Thicknesses and shapes of layers in the accompanying drawings do not reflect real scales, and only serve to illustrate contents of the present disclosure.

Figure 2:
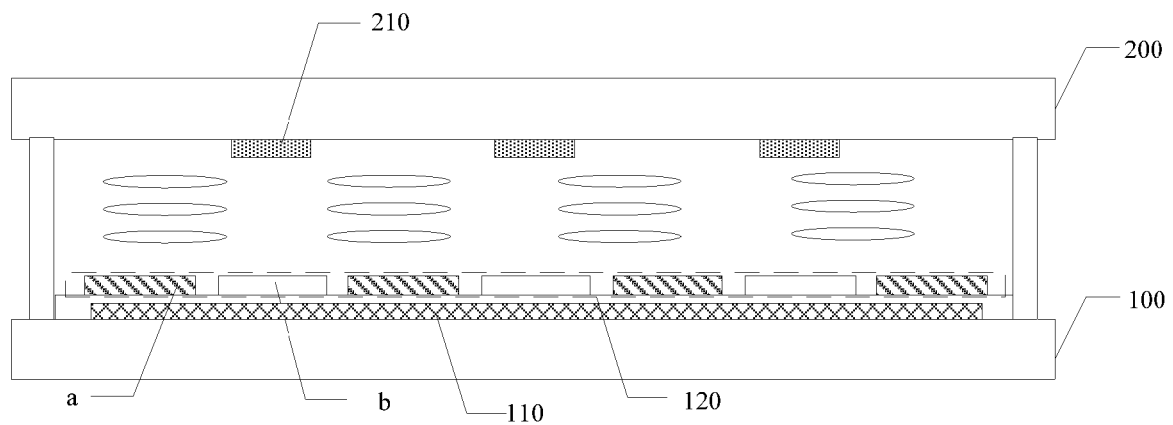
FIG. 2 is a sectional diagram of an in-cell touch panel along a longitudinal direction provided in an embodiment of the present disclosure.

FIG. 2 is a sectional diagram of an in-cell touch panel in a longitudinal direction provided in an embodiment of the present disclosure. An in-cell touch panel provided in an embodiment of the present disclosure, as shown in FIG. 2, includes an array substrate 100 that includes gate lines 110 and a common electrode layer 120, and an opposed substrate 200 disposed oppositely to the array substrate 100.

Figure 3A:
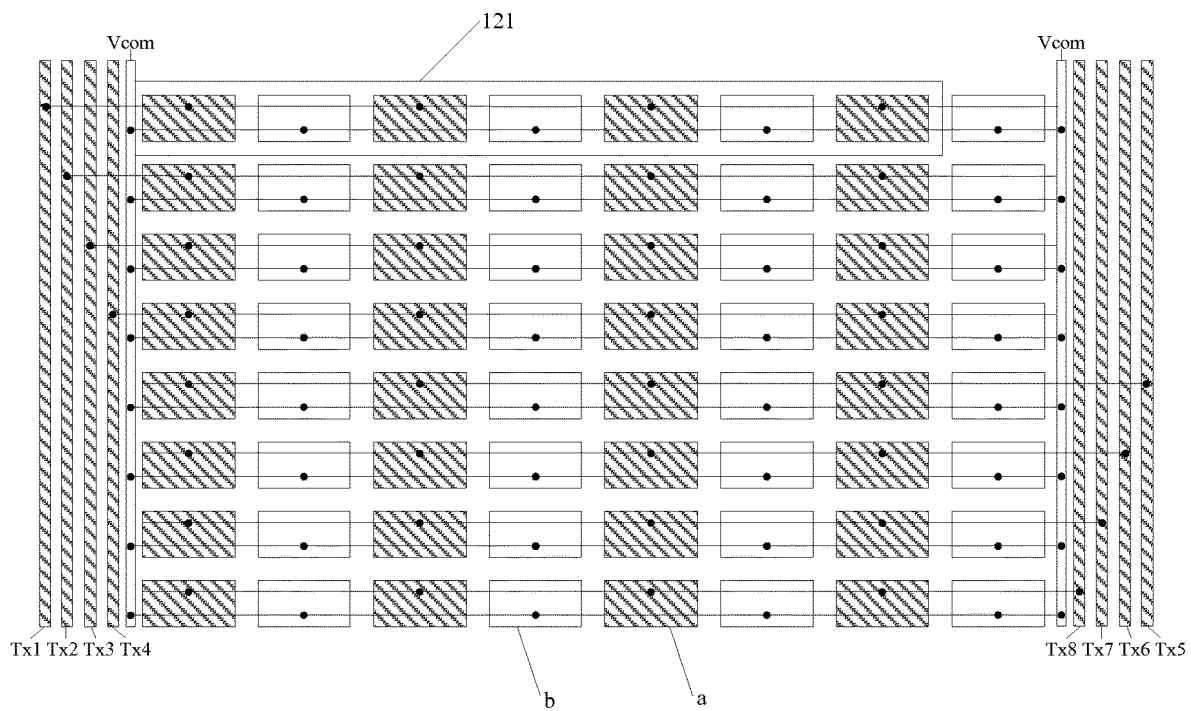
FIGS. 3a and 3b are top views of an in-cell touch panel provided in an embodiment of the present disclosure respectively.
Figure 3B:
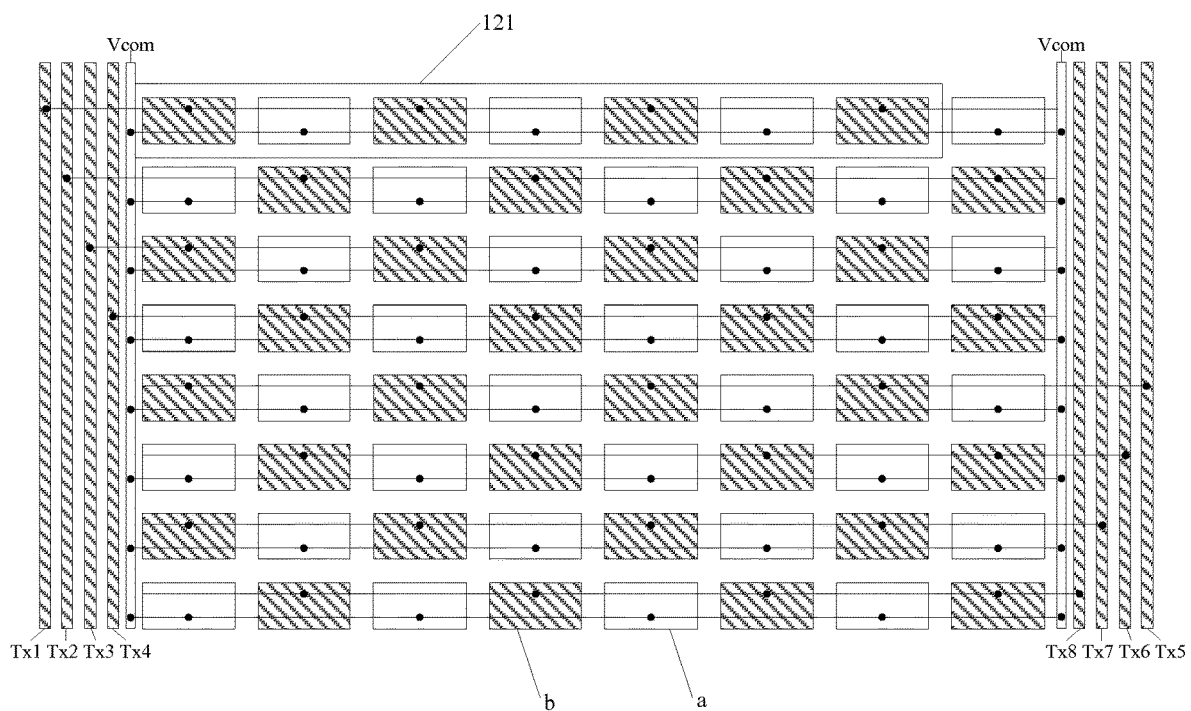

As shown in FIG. 3a and FIG. 3b, the common electrode layer 120 of the array substrate 100 is partitioned into a plurality of sub-electrodes (shown as blocks in FIGS. 3a and 3b) arranged in an array. In each row of sub-electrodes, sub-electrodes that are disposed alternately (shown as filled blocks in FIGS. 3a and 3b) serve as touch driving sub-electrodes "a" that form a touch driving electrode 121, and sub-electrodes other than the touch driving sub-electrodes "a" serve as common sub-electrodes "b."

The opposed substrate 200 has a plurality of touch sensing electrodes 210 disposed across and above the touch driving electrodes 121. An orthogonal projection of each touch sensing electrode 210 on the array substrate 100 is located within an area where a corresponding common sub-electrode "b" is located. For example, as shown in FIG. 3a, all touch driving electrodes 121 disposed on the array substrate 100 extend in a horizontal direction, and all touch sensing electrodes 210 disposed on the opposed substrate 200 extend in a vertical direction. Embodiments of the present disclosure do not limit the extension directions of touch driving electrodes and touch sensing electrodes, which may be set according to practical needs.

Upon a line-by-line scanning of gate lines covered by respective rows of sub-electrodes, sub-electrodes in a currently-scanned row are used to be applied with a common electrode signal (Vcom), touch driving sub-electrodes in rows other than the currently-scanned row of sub-electrodes are used to be applied with corresponding touch driving signals "Touch." That is, while one row of sub-electrodes is used for display, other rows of sub-electrodes are used for touch driving.

In at least one example, while the gate lines covered by respective rows of sub-electrodes are being scanned line by line, common sub-electrodes in rows of sub-electrodes other than the currently-scanned row of sub-electrodes are used to be applied with the common electrode signal Vcom or applied with no signal (for example, suspended).

By employing the above-mentioned driving manner for an in-cell touch panel provided in the embodiments of the present disclosure, simultaneous display and touch operations can be achieved, ensuring that display and touch problems resulted from insufficiency of time due to time-division driving would not occur during high resolution display.

For example, in a specific implementation of the above-mentioned in-cell touch panel provided in the embodiments of the present disclosure, the common electrode layer of the array substrate is partitioned into a plurality of sub-electrodes arranged in an array, and the plurality of sub-electrodes may be divided into touch driving sub-electrodes and common sub-electrodes in the following two ways.

In a first way, as shown in FIG. 3a, touch driving sub-electrodes "a" and common sub-electrodes "b" are aligned in full columns, respectively. That is, one column of touch driving sub-electrodes "a" and one column of common sub-electrodes "b" are arranged alternately. FIG. 3a shows 8 touch driving electrodes Tx1, . . . , Tx8, each of which includes 4 touch driving sub-electrodes "a" respectively.

In a second way, as shown in FIG. 3b, touch driving sub-electrodes "a" and common sub-electrodes "b" are arranged alternately in both the row direction and column direction of the matrix. FIG. 3b shows 8 touch driving electrodes Tx1, . . . , Tx8, each of which includes 4 touch driving sub-electrodes "a" respectively.

By way of example, an array substrate that uses the first way will be described below to explain in detail how the above-mentioned in-cell touch panel provided in the embodiments of the present disclosure implements simultaneous display and touch driving operations.

Figure 4A:
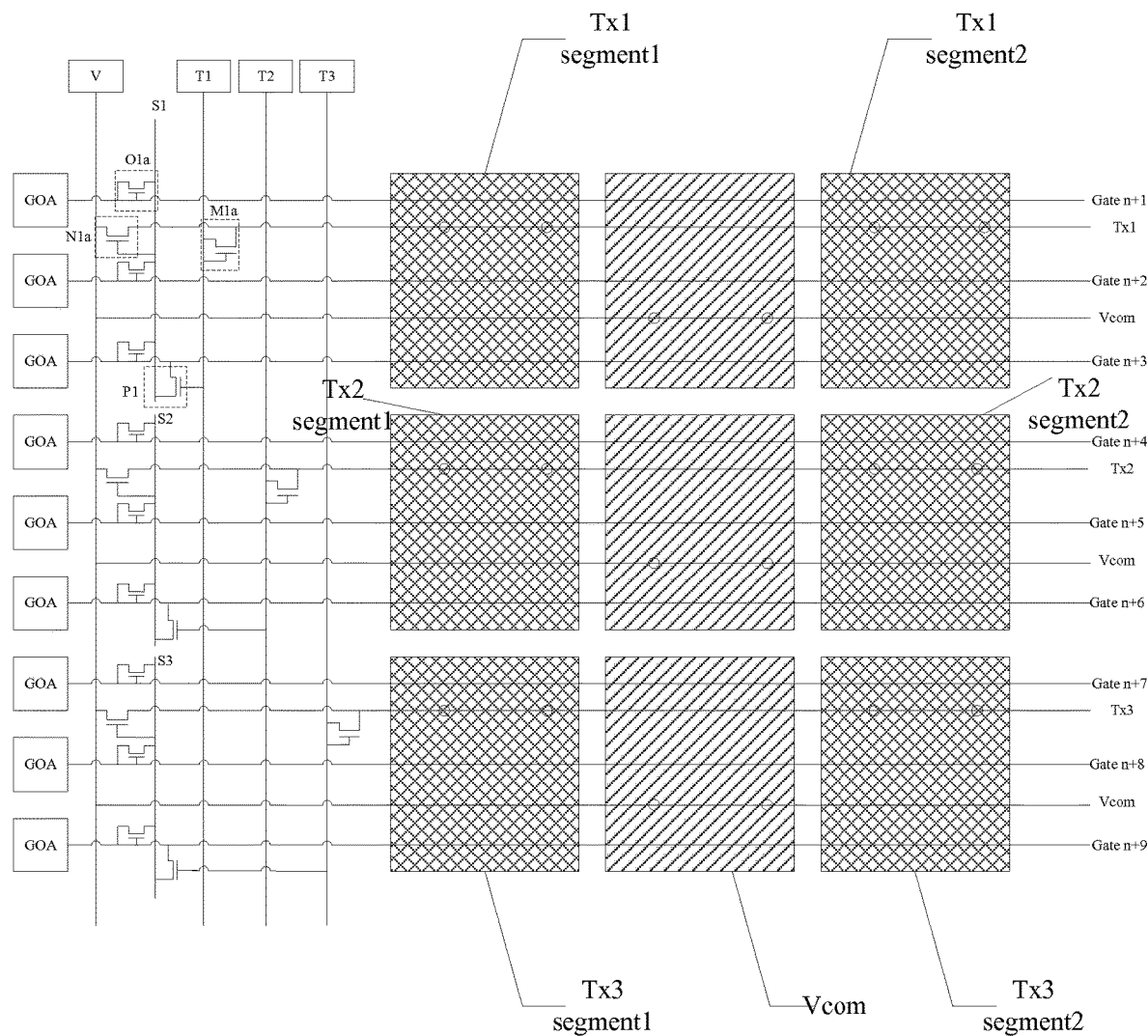
FIG. 4a is a schematic diagram of an array substrate in an in-cell touch panel provided in a first embodiment of the present disclosure.
Figure 5A:
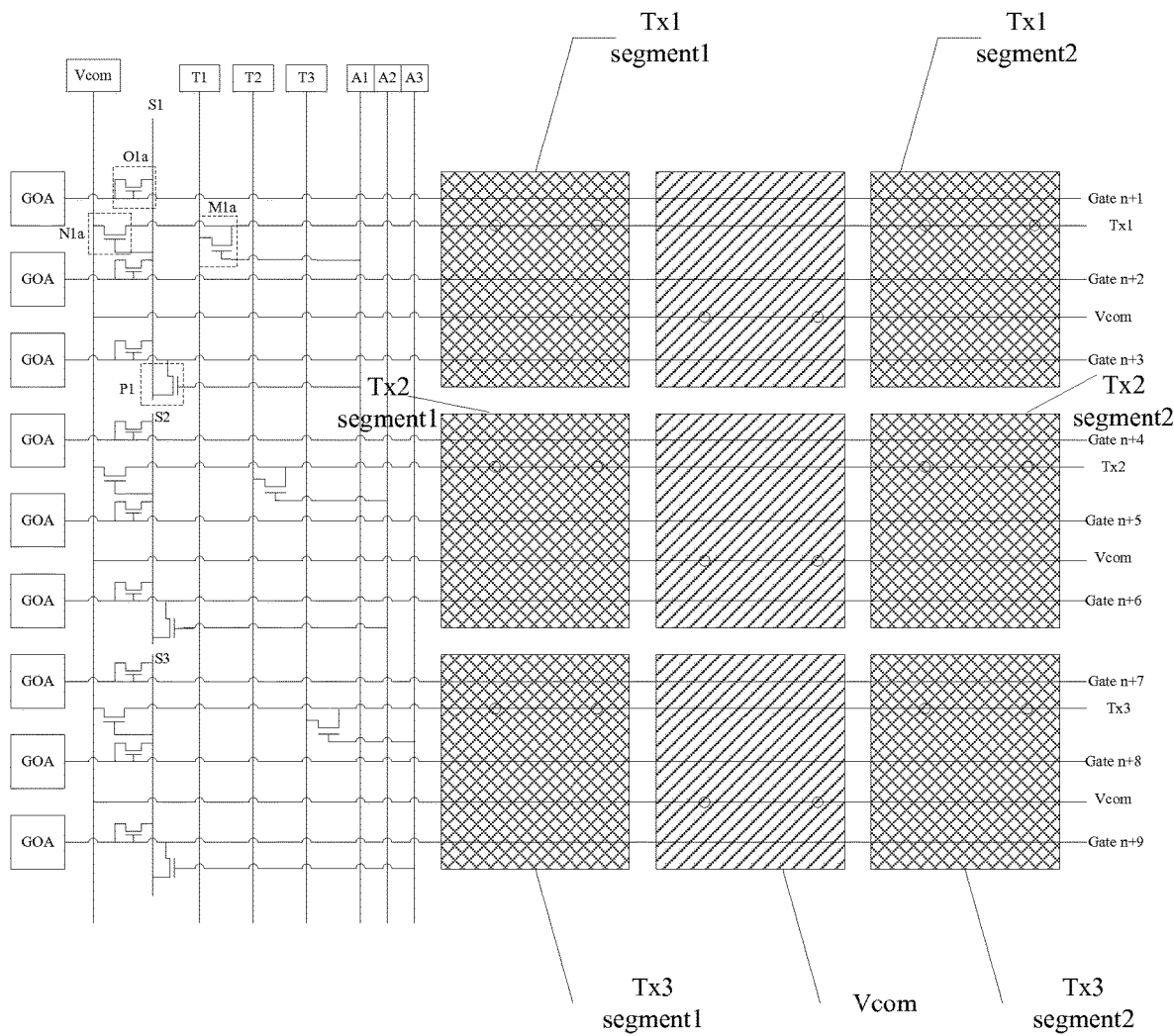
FIG. 5a is a schematic diagram of an array substrate in an in-cell touch panel provided in a second embodiment of the present disclosure.

Consider an array substrate with a common electrode layer containing 3*3 sub-electrodes as an example, as shown in FIGS. 4a and 5a. Both the first and third columns of sub-electrodes serve as touch driving sub-electrodes, and the second column of sub-electrodes serve as common sub-electrodes. The touch driving sub-electrodes are divided into 3 touch driving electrodes Tx1, Tx2 and Tx3 each extending in a horizontal direction, and each touch driving electrode includes two touch driving sub-electrodes segment 1 and segment 2.

Generally, a touch density of a touch panel is typically on the order of millimeters (mm). Therefore, in a specific implementation, it is possible to select a density of touch driving sub-electrodes and an occupied area of each touch driving sub-electrode according to a desired touch density to ensure accomplishment of the desired touch density. Generally, touch driving sub-electrodes are designed as square electrodes each of 5 mm*5 mm or so. However, a display density of a display screen is generally on the order of microns. Therefore, a touch driving electrode 121 may generally correspond to a plurality of pixel units in the display screen. That is, a touch driving electrode 121 may cover a plurality of gate lines. In FIGS. 4a and 5a, by way of example, one row of sub-electrodes covers 3 gate lines, where a first row of sub-electrodes covers gate lines Gate n+1, Gate n+2 and Gate n+3, a second row of sub-electrodes covers gate lines Gate n+4, Gate n+5 and Gate n+6, and a third row of sub-electrodes covers gate lines Gate n+7, Gate n+8 and Gate n+9.

Figure 4B:
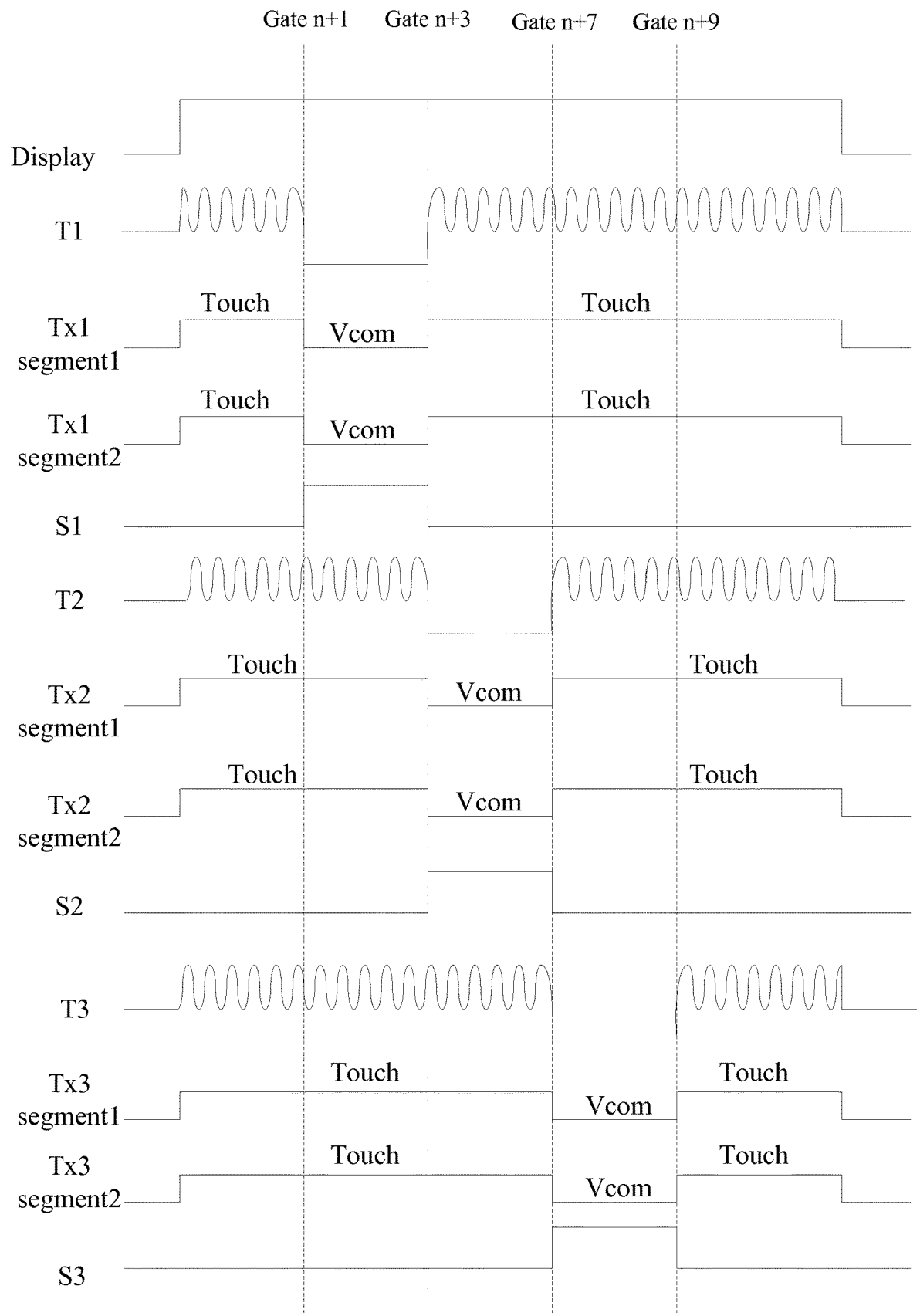
Figure 5B:
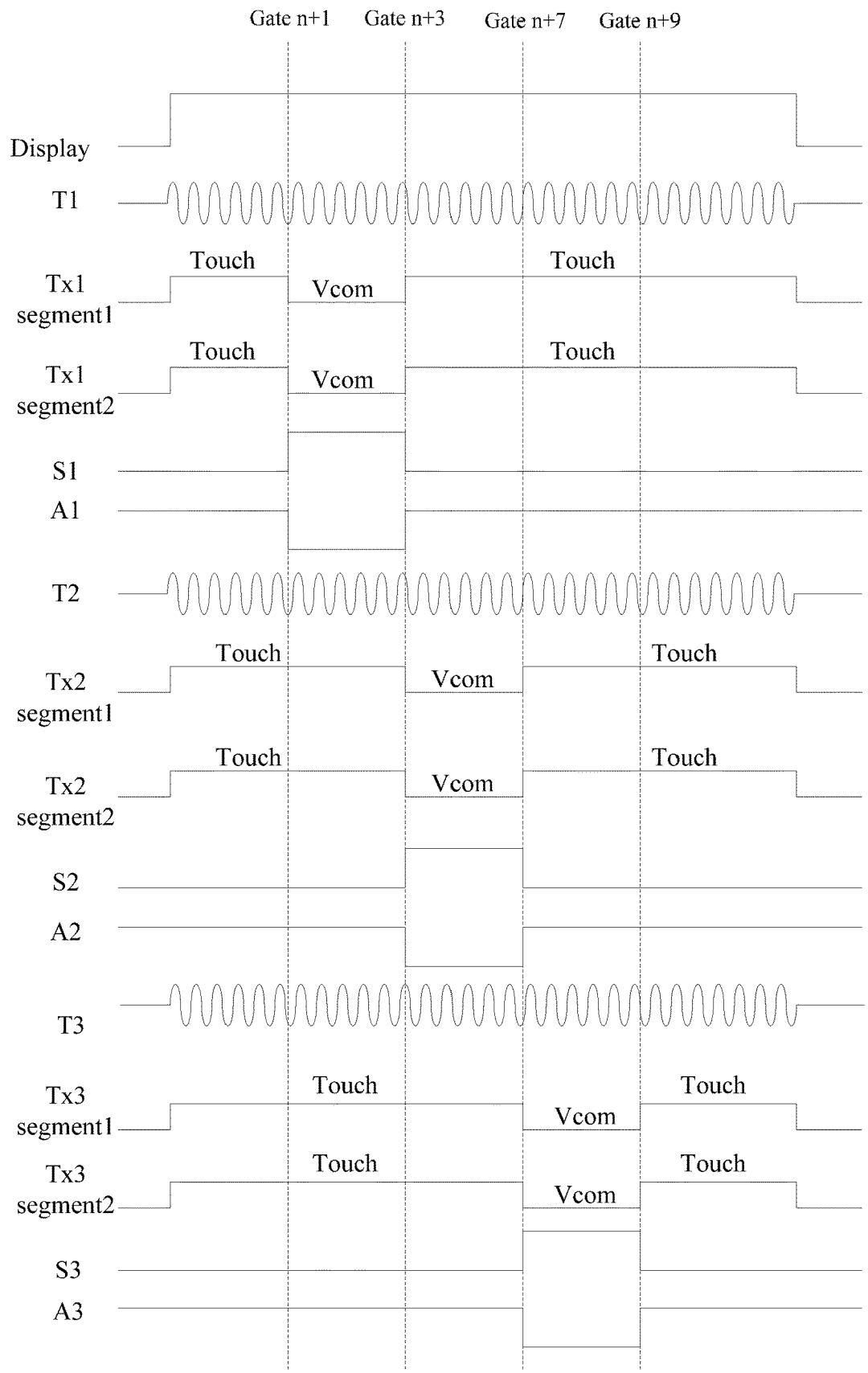

In a time duration of a frame, gate driving circuits (GOAs) connected with respective gate lines may scan the respective gate lines line by line. As shown in FIG. 4b and FIG. 5b, while scanning from the gate line Gate n+1 to the gate line Gate n+3, touch driving sub-electrodes Tx1 segment 1 and Tx1 segment 2 in the first row of sub-electrodes serve as common sub-electrodes and are loaded with the common electrode signal Vcom; and touch driving sub-electrodes Tx2 segment 1 and Tx2 segment 2 in the second row of sub-electrodes and touch driving sub-electrodes Tx3 segment 1 and Tx3 segment 2 in the third row of sub-electrodes are used for touch scanning and are loaded with touch driving signals Touch. Similarly, while scanning from the gate line Gate n+4 to the gate line Gate n+6, the second row of sub-electrodes serves as common sub-electrodes and is loaded with the common electrode signal Vcom; and touch driving sub-electrodes Tx1 segment 1, Tx1 segment 2, Tx3 segment 1 and Tx3 segment 2 in the first and third rows of sub-electrodes respectively are used for touch scanning and are loaded with touch driving signals Touch. While scanning from the gate line Gate n+7 to the gate line Gate n+9, the third row of sub-electrodes serves as common sub-electrodes and is loaded with the common electrode signal Vcom; and touch driving sub-electrodes Tx1 segment 1, Tx1 segment 2, Tx2 segment 1 and Tx2 segment 2 in the first and second rows of sub-electrodes respectively are used for touch scanning and are loaded with touch driving signals "Touch." This guarantees that in a time period of a frame, the three rows of sub-electrodes in the entire panel are scanned once according to display driving, and each row of sub-electrodes is scanned twice according to touch driving. Thus, it is possible to achieve that a scanning frequency of touch driving is 2 times of the scanning frequency of display driving. For example, a 60 Hz scanning is conducted for display driving, and a 120 Hz scanning may be conducted for touch driving, which satisfies general touch driving requirements (80 Hz-120 Hz).

By way of example, the array substrate having a common electrode layer containing 3*3 sub-electrodes as shown in FIGS. 4a and 5a will be described below to explain how the above-mentioned in-cell touch panel provided in the embodiments of the present disclosure controls a same touch driving sub-electrode to be applied with different electrical signals in different time intervals.

Embodiment 1

As shown in FIG. 4a, in a non-display area of the array substrate 100, there are generally provided with, for example, touch signal lines T1, T2 and T3 that are in one-to-one correspondence with touch driving electrodes Tx1, Tx2 and Tx3, display control lines S1, S2 and S3, and a common electrode signal line V. In order to facilitate applying corresponding electrical signals, these wires generally extend in a vertical direction in the non-display area of the array substrate.

In each row of sub-electrodes, the corresponding touch driving electrode is connected with a corresponding touch signal line via a touch switching device. For example, the touch driving sub-electrode Tx1 segment 1 in the first row is connected with a touch signal line T1 via a touch switching device M1a. The touch switching device M1a is configured to conduct between the touch signal line T1 and the touch driving sub-electrode Tx1 segment 1 of the touch driving electrode Tx1 to load a corresponding touch scanning signal to the touch driving sub-electrode Tx1 segment 1, when gate lines (Gate n+4 to Gate n+9) covered by rows of sub-electrodes (the second and third rows) other than this row of sub-electrodes (the first row) are scanned one by one.

In each row of sub-electrodes, the corresponding touch driving electrode is connected with the common electrode signal line via a display switching device, and a control end of the display switching device is connected with a display control line corresponding to the touch driving electrode. For example, the touch driving sub-electrode Tx1 segment 1 in the first row is connected with the common electrode signal line V via a display switching device N1a, and a control end of the display switching device N1a is connected with a display control line S1. The display switching device N1a is configured to conduct between the common electrode signal line V and the touch driving sub-electrode Tx1 segment 1 of the touch driving sub-electrode Tx1 to load the common electrode signal to the touch driving sub-electrode Tx1 segment 1, when gate lines Gate n+1 to Gate n+3 covered by the row of sub-electrodes (the first row) are scanned line by line (e.g., when the gate lines Gate n+1 to Gate n+3 covered by the first row of sub-electrodes are currently scanned one by one).

The above description only uses the touch driving sub-electrode Tx1 segment 1 as an example, and operating principles of other touch driving sub-electrodes are similar and will not be described in detail here.

For example, in a specific implementation, as shown in FIG. 4a, the above-mentioned touch switching device M1a may include: a first switching transistor that includes a gate and a source both connected with the touch signal line T1, and a drain connected with the touch driving electrode Tx1 (for example, the touch driving sub-electrode Tx1 segment 1). The touch signal line T1 is loaded with a touch scanning signal only when gate lines covered by other touch driving electrodes except the touch driving electrode Tx1 that is connected with the touch signal line T1 are scanned one by one. As shown in FIG. 4a, the touch signal line T1 is loaded with a low level signal to turn off the first switching transistor when the gate lines Gate n+1 to Gate n+3 are scanned one by one. For example, the above-mentioned display switching device N1a may include: a second switching transistor with a gate connected with the display control line S1, a drain connected with the touch driving electrode Tx1 (e.g., the touch driving sub-electrode Tx1 segment 1), and a source connected with the common electrode signal line V.

In a specific implementation, since there are many wires disposed in the non-display area of the array substrate, a large space will be occupied if each wire is provided with an input signal separately. Therefore, in at least one example, it is possible to control signals applied on the display control lines S1, S2 and S3 with signals applied on other wires. For example, as shown in FIG. 4a, it is possible to connect a display control line corresponding to a respective touch driving electrode with gate lines covered by the respective touch driving electrode via turning-on switching devices, and to connect the display control line with the last scanned gate line covered by the respective touch driving electrode via a turning-off switching device. A control end of the turning-off switching device is connected with a touch signal line corresponding to the respective touch driving electrode. For example, the display control line S1 corresponding to the first row of touch driving electrode Tx1 is connected with the gate lines Gate n+1 to Gate n+3 through three turning-on switching devices O1a respectively, and is connected with the last scanned gate line Gate n+3 covered by the first row of sub-electrodes via a turning-off switching device P1. A control end of the turning-off switching device P1 is connected with the touch signal line T1 corresponding to the row of touch driving electrode Tx1. The turning-on switching devices O1a and turning-off switching device P1 are configured to allow the display control line to have control signals with opposite polarities, when the gate lines covered by the first row of sub-electrodes are being scanned and when the scanning of the gate lines covered by the first row of sub-electrodes is completed. That is, when the gate lines Gate n+1 to Gate n+3 are being scanned one by one, a signal applied on the display control line S1 is identical to a signal applied on the respective scanned gate line, e.g., a high level signal; and when the scanning of the gate line Gate n+3 is completed and the signal applied to the gate line Gate n+3 becomes a low level signal, the signal applied on the display control line S1 is pulled down to be the low level signal of the gate line Gate n+3. That is because at that time the touch signal line T1 begins to be loaded with a touch signal, so that the turning-off switching device P1 is switched on to pull down the signal on the display control line S1 to be the low level signal of the gate line Gate n+3.

In a specific implementation as shown in FIG. 4a, the above-mentioned turning-on switching device O1a is, for example, a third switching transistor that includes a gate and a source both connected with the corresponding gate line Gate n+1, and a drain connected with the display control line S1. The above-mentioned turning-off switching device P1 is, for example, a fourth switching transistor with a gate connected with the touch signal line T1, a source connected with the gate line Gate n+3, and a drain connected with the display control line S1.

Embodiment 2

As shown in FIG. 5a, in the non-display area of the array substrate 100, there are provided with touch signal lines T1, T2 and T3 that have one-to-one correspondence with the touch driving electrodes Tx1, Tx2 and Tx3, display control lines S1, S2 and S3, and a common electrode signal line V; and there are further provided with touch control lines A1, A2 and A3 that are in one-to-one correspondence with the touch driving electrodes Tx1, Tx2 and Tx3. In order to facilitate applying corresponding electrical signals, these wires generally extend in the vertical direction in the non-display area of the array substrate.

In each row of sub-electrodes, the corresponding touch driving electrode is connected with a corresponding touch signal line via a touch switching device, and a control end of the touch switching device is connected with a corresponding touch control line. For example, the touch driving sub-electrode Tx1 segment 1 in the first row is connected with a touch signal line T1 via a touch switching device M1a, and a control end of the touch switching device M1a is connected with a touch control line A1. The touch switching device M1a is configured to conduct between the touch signal line T1 and the touch driving sub-electrode Tx1 segment 1 of the touch driving electrode Tx1 to load a corresponding touch scanning signal to the touch driving sub-electrode Tx1 segment 1, when the gate lines (Gate n+4 to Gate n+9) covered by rows of sub-electrodes (the second and third rows) other than this row of sub-electrodes (the first row) are scanned one by one.

In each row of sub-electrodes, the corresponding touch driving electrode is connected with the common electrode signal line via a display switching device, and a control end of the display switching device is connected with a corresponding display control line. For example, the touch driving sub-electrode Tx1 segment 1 in the first row is connected with the common electrode signal line V via a display switching device N1a, and a control end of the display switching device N1a is connected with the display control line S1. The display switching device N1a is configured to conduct between the common electrode signal line V and the touch driving sub-electrode Tx1 segment 1 of the touch driving sub-electrode Tx1 so as to load the common electrode signal to the touch driving sub-electrode Tx1 segment 1, when the gate lines Gate n+1 to Gate n+3 covered by the row of sub-electrodes (the first row) are being scanned line by line.

The above description only uses the touch driving sub-electrode Tx1 segment 1 as an example, and operating principles of other touch driving sub-electrodes are similar and will not be described in detail here.

In a specific implementation, for example, as shown in FIG. 5a, the above-mentioned touch switching device M1a may include: a first switching transistor that includes a gate connected with the touch signal line T1, a drain connected with the touch driving electrode Tx1 (e.g., the touch driving sub-electrode Tx1 segment 1), and a source connected with the touch signal line T1. For example, the above-mentioned display switching device N1a may include: a second switching transistor with a gate connected with the display control line S1, a drain connected with the touch driving electrode Tx1 (e.g., the touch driving sub-electrode Tx1 segment 1), and a source connected with the common electrode signal line V.

It can be seen that, when using switching transistors as touch switching devices and display switching devices, electrical signals applied on the touch control lines and electrical signals applied on the display control lines serve as control signals for turning on and/or turning off the switching transistors, respectively. Therefore, corresponding control signals should be set according to the types of switching transistors in specific implementations. For example, when the first and second switching transistors are both N-type transistors or both P-type transistors, a display control line and a touch control line corresponding to a same touch driving electrode are configured to be applied with control signals with opposite polarities at the same time, illustrated by control signals applied to lines A1 and S1, A2 and S2, A3 and S3 in FIG. 5b, so as to ensure that only one of the first and second switching transistors are selected to be turned on. When the first and second switching transistors are an N-type transistor and a P-type transistor (that is, one of the first and second switching transistors is an N-type transistor and the other is a P-type transistor), the display control line and the touch control line corresponding to the same touch driving electrode are configured to be applied with control signals with the same polarity at the same time, so as to ensure that one of the first and second switching transistors is selected to be turned on.

Furthermore, in a specific implementation, since there are many wires disposed in the non-display area of the array substrate, a large space will be occupied if each wire is provided with an input signal separately. Therefore, in at least one example, it is possible to control signals applied on the display control lines S1, S2 and S3 with signals applied on other wires. For example, as shown in FIG. 5a, it is possible to connect a display control line corresponding to a respective row of sub-electrodes with the gate lines covered by the respective row of electrodes via turning-on switching devices, and to connect the display control line with the last scanned gate line covered by the respective row of sub-electrodes via a turning-off switching device. A control end of the turning-off switching device is connected with a touch control line corresponding to the respective touch driving electrode. For example, the display control line S1 corresponding to the first row of touch driving electrode Tx1 is connected with the gate lines Gate n+1 to Gate n+3 through three turning-on switching devices O1a respectively, and is connected with the last scanned gate line Gate n+3 covered by the first row of sub-electrodes via a turning-off switching device P1. A control end of the turning-off switching device P1 is connected with a touch control line A1 corresponding to the row of touch driving electrode Tx1. The turning-on switching devices O1a and turning-off switching device P1 are configured to allow the display control line to have control signals with opposite polarities, when the gate lines covered by the first row of sub-electrodes are being scanned and when the scanning of the gate lines covered by the first row of sub-electrodes is completed. That is, when the gate lines Gate n+1 to Gate n+3 are being scanned one by one, a signal applied on the display control line S1 is identical to a corresponding signal applied on the scanned gate line, e.g., a high level signal; and when the scanning of the gate line Gate n+3 is completed and the signal applied to the gate line Gate n+3 becomes a low level signal, the signal applied on the display control line S1 is pulled down to be the low level signal of the gate line Gate n+3. That is because at that time a signal change on the touch control line A1 makes the turning-off switching device P1 to be switched on to pull down the signal on the display control line S1 to be the low level signal of the gate line Gate n+3.

In a specific implementation, as shown in FIG. 5a, the above-mentioned turning-on switching device O1a is, for example, a third switching transistor that includes both a gate and a source connected with the corresponding gate line Gate n+1, and a drain connected with the display control line S1. The above-mentioned turning-off switching device P1 is, for example, a fourth switching transistor with a gate connected with the touch control line A1, a source connected with the gate line Gate n+3, and a drain connected with the display control line S1.

It is to be noted that in the above-mentioned embodiments, any one of the touch signal line, the display control line, the common electrode signal line and the touch control line may be disposed in the display area according to practical needs. For example, any one of the touch signal line, the display control line, the common electrode signal line and the touch control line may be disposed at locations corresponding to the black matrix in the display area to reduce impacts on an aperture opening ratio, which will not be described here.

Based on the same inventive concept, at least one embodiment of the present disclosure further provides a display device including the in-cell touch panel provided in any of the above-mentioned embodiments of the present disclosure. The display device may be any product or component having the display function such as a cellphone, a tablet computer, a TV set, a display, a notebook computer, a digital picture frame and a navigator, etc. The above-mentioned embodiments of the in-cell touch panel may be referred to for implementations of the display device, and duplicate descriptions will not be provided here.

At least one embodiment of the present disclosure further provides a touch driving method including: scanning gate lines covered by respective rows of sub-electrodes in a line-by-line manner, wherein the respective rows of sub-electrodes are from sub-electrodes arranged in an array, and the sub-electrodes arranged in the array are included in a common electrode layer on an array substrate. In this step, sub-electrodes that are disposed alternately in a respective row of sub-electrodes serve as touch driving sub-electrodes which form a touch driving electrode, and sub-electrodes other than the touch driving sub-electrodes serve as common sub-electrodes. The touch driving method further includes: upon scanning the gate lines covered by the respective rows of sub-electrodes in the line-by-line manner, applying a common electrode signal to sub-electrodes in a currently-scanned row of sub-electrodes, and applying touch driving signals to touch driving electrodes in rows of sub-electrodes other than the currently-scanned row of sub-electrode.

The touch driving method provided in the embodiments of the present disclosure enables simultaneous display and touch operations by allowing other rows of sub-electrodes to conduct touch driving while one row of sub-electrodes are conducting display.

In the touch driving method provided in the embodiments of the present disclosure, while scanning the gate lines covered by each row of sub-electrodes one by one, it is possible to apply a common electrode signal to common sub-electrodes in rows of sub-electrodes other than this currently-scanned row of sub-electrodes. The touch driving method further includes steps of applying gray scale signals to data lines and detecting touch sensing signals with touch sensing electrodes to determine one or more touch positions. This will not be described in detail in embodiments of the present disclosure.

In the in-cell touch panel, the display device, and the touch driving method provided in embodiments of the present disclosure, the common electrode layer connected in an entire surface of the array substrate is partitioned into a plurality of sub-electrodes arranged in an array, sub-electrodes that are disposed alternately in each row of sub-electrodes serve as touch driving sub-electrodes that form a touch driving electrode, sub-electrodes other than the touch driving sub-electrodes serve as common sub-electrodes; a plurality of touch sensing electrodes disposed across and over the touch driving electrodes are provided on the opposed substrate, and a projection of each touch sensing electrode on the array substrate is located within an area where a corresponding common sub-electrode is located. The following driving manner may be adopted: upon a line-by-line scanning of gate lines covered by respective rows of sub-electrodes, sub-electrodes in a currently-scanned row of sub-electrodes are used to be applied with a common electrode signal, touch driving electrodes in rows of sub-electrodes other than the currently-scanned row of sub-electrodes are used to be applied with touch driving signals, and common sub-electrodes in the rows of sub-electrodes other than the currently-scanned row of sub-electrodes are used to applied with the common electrode signal. That is, while one row of sub-electrodes is conducting display, other rows of sub-electrodes are conducting touch driving. With the above-mentioned driving manner, it is possible to achieve simultaneous display and touch operations and guarantee that various display and touch problems resulted from insufficiency of time caused by time-division driving will not occur upon high resolution display.

What are described above is related to the illustrative embodiments of the disclosure only and not limitative to the scope of the disclosure; the scopes of the disclosure are defined by the accompanying claims.

The present application claims priority of Chinese Patent application No. 201410643152.3 filed on Nov. 6, 2014, the content of which is incorporated by reference herein in its entirety as part of the present application.

The invention claimed is:

1. An in-cell touch panel, comprising an array substrate that includes gate lines and a common electrode layer, and an opposed substrate disposed oppositely to the array substrate, wherein: the common electrode layer of the array substrate is partitioned into a plurality of sub- electrodes arranged in an array, wherein sub-electrodes that are disposed alternately in a respective row of sub-electrodes serve as touch driving sub-electrodes which form a touch driving electrode, and sub-electrodes other than the touch driving sub-electrodes serve as common sub-electrodes; upon a line-by-line scanning of gate lines covered by respective rows of sub-electrodes, in a time period when sub-electrodes in a currently-scanned row of sub-electrodes are used to be applied with a common electrode signal, touch driving electrodes in rows of sub-electrodes other than the currently-scanned row of sub-electrodes are used to be applied with touch driving signals; the opposed substrate includes a plurality of touch sensing electrodes disposed across and over the touch driving electrodes, and an orthogonal projection of each of the touch sensing electrodes on the array substrate is located within an area where a corresponding common sub-electrode is located; in a non-display area and/or a display area the array substrate is provided with: touch signal lines that have one-to-one correspondence with the touch driving electrodes, display control lines, and a common electrode signal line; in each row of sub-electrodes, a corresponding touch driving electrode is connected with a corresponding touch signal line via a touch switching device; the touch switching device is configured to conduct between the corresponding touch signal line and the corresponding touch driving electrode when gate lines covered by rows of sub-electrodes other than the corresponding row of sub-electrodes are being scanned line by line; in each row of sub-electrodes, a corresponding touch driving electrode is connected with the common electrode signal line via a display switching device, and a control end of the display switching device is connected with a corresponding display control line; the display switching device is configured to conduct between the common electrode signal line and the corresponding touch driving electrode when gate lines covered by the corresponding row of sub-electrodes are being scanned line by line; a display control line corresponding to each touch driving electrode is connected with gate lines covered by the corresponding touch driving electrode via turning-on switching devices, and is connected with a last scanned gate line covered by the corresponding touch driving electrode via a turning-off switching device, and a control end of the turning-off switching device is connected with a touch signal line that corresponds to the corresponding touch driving electrode; and the turning-on switching devices and the turning-off switching device are configured to allow the display control line to have control signals with opposite polarities when gate lines covered by the corresponding row of sub-electrodes are being scanned and when the scanning of the gate lines covered by the corresponding row of sub-electrodes is completed.

2. The in-cell touch panel of claim 1, wherein upon the line-by-line scanning of the gate lines covered by the respective rows of sub-electrodes, common sub-electrodes in the rows of sub-electrodes other than the currently-scanned row of sub-electrodes are used to be applied with the common electrode signal or with no signals.

3. The in-cell touch panel of claim 1, wherein the touch switching device comprises a first switching transistor, a gate and a source of the first switching transistor are connected with the corresponding touch signal line, and a drain of the first switching transistor is connected with the corresponding touch driving electrode; and the corresponding touch signal line is applied with a touch scanning signal only when gate lines covered by touch driving electrodes other than the corresponding touch driving electrode are being scanned line by line.

4. The in-cell touch panel of claim 1, wherein the display switching device comprises: a second switching transistor with a gate connected with the corresponding display control line, a drain connected with the corresponding touch driving electrode, and a source connected with the common electrode signal line.

5. The in-cell touch panel of claim 1, wherein each of the turning-on switching devices comprises a third switching transistor, a gate and a source of the third switching transistor are connected with a corresponding gate line, and a drain of the third switching transistor is connected with the corresponding display control line.

6. The in-cell touch panel of claim 1, wherein the turning-off switching device comprises: a fourth switching transistor with a gate connected with a corresponding touch signal line, a source connected with a corresponding gate line, and a drain connected with the corresponding display control line.

7. The in-cell touch panel of claim 1, wherein in a non-display area and/or a display area the array substrate is provided with touch control lines in one-to-one correspondence with the touch driving electrodes; and in each row of sub-electrodes, a control end of a touch switching device connected with a corresponding touch driving electrode is connected with a corresponding touch control line.

8. The in-cell touch panel of claim 7, wherein the touch switching device comprises: a first switching transistor with a gate connected with the corresponding touch control line, a drain connected with the corresponding touch driving electrode, and a source connected with the corresponding touch signal line.

9. The in-cell touch panel of claim 8, wherein the display switching device comprises: a second switching transistor with a gate connected with the corresponding display control line, a drain connected with the corresponding touch driving electrode, and a source connected with the common electrode signal line.

10. The in-cell touch panel of claim 9, wherein the first switching transistor and the second switching transistor are both N-type transistors or both P-type transistors, and a display control line and a touch control line corresponding to a same touch driving electrode are configured to be applied with control signals with opposite polarities respectively; or the first switching transistor and the second switching transistor are an N-type transistor and a P-type transistor respectively, and a display control line and a touch control line corresponding to a same touch driving electrode are configured to be applied with control signals with a same polarity respectively.

11. The in-cell touch panel of claim 7, wherein a display control line corresponding to each touch driving electrode is connected with gate lines covered by the corresponding touch driving electrode via turning-on switching devices, and is connected with a last scanned gate line covered by the corresponding touch driving electrode via a turning-off switching device, and a control end of the turning-off switching device is connected with a touch control line that corresponds to the corresponding touch driving electrode; and the turning-on switching devices and the turning-off switching device are configured to allow the display control line to have control signals with opposite polarities when gate lines covered by the corresponding row of sub-electrodes are being scanned and when the scanning of the gate lines covered by the corresponding row of sub-electrodes is completed.

12. The in-cell touch panel of claim 11, wherein each of the turning-on switching devices comprises: a third switching transistor with both a gate and a source being connected with a corresponding gate line, and a drain being connected with the display control line.

13. The in-cell touch panel of claim 11, wherein the turning-off switching device comprises: a fourth switching transistor with a gate connected with a corresponding touch control line, a source connected with a corresponding gate line, and a drain connected with the display control line.

14. The in-cell touch panel of claim 1, wherein in the plurality of sub-electrodes that is arranged in the array and partitioned from the common electrode layer, touch driving sub-electrodes and common sub-electrodes are arranged alternately in both row and column directions of a matrix; or in the plurality of sub-electrodes that is arranged in the array and partitioned from the common electrode layer, touch driving sub-electrodes and common sub-electrodes are both arranged in entire columns in the matrix respectively.

15. A display device, comprising the in-cell touch panel of claim 1.

16. A touch driving method, comprising: scanning gate lines covered by respective rows of sub-electrodes in a line-by-line manner, wherein the respective rows of sub-electrodes are from sub-electrodes arranged in an array, the sub-electrodes arranged in the array are included in a common electrode layer on an array substrate, sub-electrodes that are disposed alternately in a respective row of sub-electrodes serve as touch driving sub-electrodes which form a touch driving electrode, and sub-electrodes other than the touch driving sub-electrodes serve as common sub-electrodes; and upon scanning the gate lines covered by the respective rows of sub-electrodes in the line-by-line manner, applying a common electrode signal to sub-electrodes in a currently-scanned row of sub-electrodes, and applying touch driving signals to touch driving electrodes in rows of sub-electrodes other than the currently-scanned row of sub-electrodes when the common electrode signal is applied to the sub-electrodes in the currently-scanned row of sub-electrodes, wherein in a non-display area and/or a display area the array substrate is provided with: touch signal lines that have one-to-one correspondence with the touch driving electrodes, display control lines, and a common electrode signal line; in each row of sub-electrodes, a corresponding touch driving electrode is connected with a corresponding touch signal line via a touch switching device; the touch switching device is configured to conduct between the corresponding touch signal line and the corresponding touch driving electrode when gate lines covered by rows of sub-electrodes other than the corresponding row of sub-electrodes are being scanned line by line; in each row of sub-electrodes, a corresponding touch driving electrode is connected with the common electrode signal line via a display switching device, and a control end of the display switching device is connected with a corresponding display control line; the display switching device is configured to conduct between the common electrode signal line and the corresponding touch driving electrode when gate lines covered by the corresponding row of sub-electrodes are being scanned line by line; a display control line corresponding to each touch driving electrode is connected with gate lines covered by the corresponding touch driving electrode via turning-on switching devices, and is connected with a last scanned gate line covered by the corresponding touch driving electrode via a turning-off switching device, and a control end of the turning-off switching device is connected with a touch signal line that corresponds to the corresponding touch driving electrode; and the turning-on switching devices and the turning-off switching device are configured to allow the display control line to have control signals with opposite polarities when gate lines covered by the corresponding row of sub-electrodes are being scanned and when the scanning of the gate lines covered by the corresponding row of sub-electrodes is completed.

17. An in-cell touch panel, comprising an array substrate that includes gate lines and a common electrode layer, and an opposed substrate disposed oppositely to the array substrate, wherein:

the common electrode layer of the array substrate is partitioned into a plurality of sub-electrodes arranged in an array, wherein sub-electrodes that are disposed alternately in a respective row of sub-electrodes serve as touch driving sub-electrodes which form a touch driving electrode, and sub-electrodes other than the touch driving sub-electrodes serve as common sub-electrodes;

upon a line-by-line scanning of gate lines covered by respective rows of sub-electrodes, sub-electrodes in a currently-scanned row of sub-electrodes are used to be applied with a common electrode signal, and simultaneously touch driving electrodes in rows of sub-electrodes other than the currently-scanned row of sub-electrodes are used to be applied with touch driving signals; and the opposed substrate includes a plurality of touch sensing electrodes disposed across and over the touch driving electrodes, and an orthogonal projection of each of the touch sensing electrodes on the array substrate is located within an area where a corresponding common sub-electrode is located, wherein:

in a non-display area and/or a display area the array substrate is provided with: touch signal lines that have one-to-one correspondence with the touch driving electrodes, display control lines, and a common electrode signal line;

in each row of sub-electrodes, a corresponding touch driving electrode is connected with a corresponding touch signal line via a touch switching device; the touch switching device is configured to conduct between the corresponding touch signal line and the corresponding touch driving electrode when gate lines covered by rows of sub-electrodes other than the corresponding row of sub-electrodes are being scanned line by line;

in each row of sub-electrodes, a corresponding touch driving electrode is connected with the common electrode signal line via a display switching device, and a control end of the display switching device is connected with a corresponding display control line; the display switching device is configured to conduct between the common electrode signal line and the corresponding touch driving electrode when gate lines covered by the corresponding row of sub-electrodes are being scanned line by line;

a display control line corresponding to each touch driving electrode is connected with gate lines covered by the corresponding touch driving electrode via turning-on switching devices, and is connected with a last scanned gate line covered by the corresponding touch driving electrode via a turning-off switching device, and a control end of the turning-off switching device is connected with a touch signal line that corresponds to the corresponding touch driving electrode; and the turning-on switching devices and the turning-off switching device are configured to allow the display control line to have control signals with opposite polarities when gate lines covered by the corresponding row of sub-electrodes are being scanned and when the scanning of the gate lines covered by the corresponding row of sub-electrodes is completed.

* * * * *